United States Patent
Malkes et al.

(10) Patent No.: US 11,210,936 B2
(45) Date of Patent: Dec. 28, 2021

(54) BROADCASTING DETAILS OF OBJECTS AT AN INTERSECTION

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: Cubic Corporation, San Diego, CA (US)

( * ) Notice: Subject to any disclaimer, the term of this patent is extended or adjusted under 35 U.S.C. 154(b) by 351 days.

(21) Appl. No.: 16/395,137

(22) Filed: Apr. 25, 2019

(65) Prior Publication Data

US 2019/0333379 A1    Oct. 31, 2019

Related U.S. Application Data

(60) Provisional application No. 62/664,029, filed on Apr. 27, 2018.

(51) Int. Cl.
*G08G 1/01* (2006.01)
*G08G 1/09* (2006.01)
(Continued)

(52) U.S. Cl.
CPC ....... *G08G 1/0141* (2013.01); *G06K 9/00785* (2013.01); *G06K 9/00805* (2013.01);
(Continued)

(58) Field of Classification Search
CPC .... G08G 1/0141; G08G 1/093; G08G 1/0112; G08G 1/0116; G06K 9/00805;
(Continued)

(56) References Cited

U.S. PATENT DOCUMENTS

| 7,421,089 B2 | 9/2008 | Camara et al. |
| 8,253,591 B2 | 8/2012 | Rothschild |

(Continued)

FOREIGN PATENT DOCUMENTS

CN    104217615 B    8/2016

OTHER PUBLICATIONS

Redmon, et al. "You Only Look Once: Unified, Real-Time Object Detection", Conference Paper, Jun. 2016, 2016 IEEE Conference on Computer Vision and Pattern Recognition (CVPR), DOI: 10.1109/CVPR.2016.91, 10 pages.

(Continued)

*Primary Examiner* — Dale W Hilgendorf
(74) *Attorney, Agent, or Firm* — Kilpatrick Townsend & Stockton, LLP

(57) ABSTRACT

Methods and apparatus consistent with the present disclosure may receive different sets of image or sensor data that may be compared for inconsistencies. Each of these sets of received data may include images of a roadway or intersection that are processed to identify objects and object locations at or near the roadway/intersection. In certain instances data received from a camera at a traffic control system may be compared with data received from a computer at a vehicle. Alternatively or additionally, different sets of data acquired by a same or by different cameras may be compared for discrepancies. When one or more discrepancies are identified in different sets of received data, corrective actions may be initiated. In certain instances, such corrective actions may include recalibrating an image acquisition system or may include sending message to a vehicle computer that identifies the discrepancy.

20 Claims, 10 Drawing Sheets

(51) Int. Cl.
*G06K 9/00* (2006.01)
*G01C 21/00* (2006.01)

(52) U.S. Cl.
CPC ....... *G06K 9/00825* (2013.01); *G08G 1/0112* (2013.01); *G08G 1/0116* (2013.01); *G08G 1/093* (2013.01); *G01C 21/3804* (2020.08); *G01C 21/3848* (2020.08)

(58) Field of Classification Search
CPC ........... G06K 9/00825; G06K 9/00785; G01C 21/3804; G01C 21/3848
See application file for complete search history.

(56) References Cited

U.S. PATENT DOCUMENTS

| | | | | |
|---|---|---|---|---|
| 8,442,791 | B2* | 5/2013 | Stahlin | H04L 67/12 |
| | | | | 702/94 |
| 8,612,313 | B2 | 12/2013 | Roberts et al. | |
| 9,719,801 | B1* | 8/2017 | Ferguson | G01S 17/931 |
| 9,916,703 | B2* | 3/2018 | Levinson | G06Q 10/08 |
| 10,108,867 | B1* | 10/2018 | Vallespi-Gonzalez | |
| | | | | G01S 17/66 |
| 10,445,599 | B1* | 10/2019 | Hicks | G05D 1/0246 |
| 10,467,897 | B2* | 11/2019 | Watanabe | G08G 1/04 |
| 10,531,075 | B1* | 1/2020 | Dariush | H04L 12/40 |
| 10,551,509 | B2* | 2/2020 | Song | G01C 21/3602 |
| 2004/0189512 | A1* | 9/2004 | Takashima | G01S 13/867 |
| | | | | 342/70 |
| 2005/0273212 | A1* | 12/2005 | Hougen | G06K 9/00805 |
| | | | | 701/1 |
| 2007/0165967 | A1* | 7/2007 | Ando | G01S 17/931 |
| | | | | 382/291 |
| 2007/0206833 | A1* | 9/2007 | Otsuka | G06K 9/00805 |
| | | | | 382/103 |
| 2007/0276600 | A1* | 11/2007 | King | G08G 1/166 |
| | | | | 701/301 |
| 2009/0136125 | A1* | 5/2009 | Fujita | G06K 9/00805 |
| | | | | 382/165 |
| 2009/0228204 | A1* | 9/2009 | Zavoli | G01S 19/49 |
| | | | | 701/532 |
| 2011/0242319 | A1* | 10/2011 | Miyajima | G01S 19/48 |
| | | | | 348/148 |
| 2014/0203959 | A1* | 7/2014 | Kriel | G01S 13/931 |
| | | | | 342/52 |
| 2014/0309805 | A1 | 10/2014 | Ricci | |
| 2015/0049193 | A1* | 2/2015 | Gupta | G03B 43/00 |
| | | | | 348/148 |
| 2015/0356872 | A1* | 12/2015 | Atsmon | G01C 21/26 |
| | | | | 701/522 |
| 2016/0035223 | A1 | 2/2016 | Gutmann et al. | |
| 2016/0116593 | A1* | 4/2016 | Kim | G01S 17/86 |
| | | | | 701/70 |
| 2017/0185850 | A1* | 6/2017 | Hsu | B60W 30/09 |
| 2018/0003505 | A1* | 1/2018 | Tateishi | G06T 7/70 |
| 2018/0025632 | A1* | 1/2018 | Breed | G01C 21/32 |
| | | | | 701/93 |
| 2018/0372866 | A1* | 12/2018 | Baba | G01V 8/10 |
| 2019/0011927 | A1* | 1/2019 | Mou | G06K 9/00791 |
| 2019/0205659 | A1* | 7/2019 | Cuban | G06K 9/00778 |
| 2020/0410784 | A1* | 12/2020 | Agrawal | G07C 5/008 |

OTHER PUBLICATIONS

Ismail et al. "Camera Calibration for Urban Traffic Scenes: Practical Issues and a Robust 2, 10, 11, 13 Approach," In Transportation Research Board Annual Meeting Compendium of Papers, [retrieved on Jun. 22, 2019]. Retrieved from the Internet: <URL: http://citeseerx.ist.psu.edu/viewdoc/summary?doi=10.1.1.154.2939>, pp. 1-20.

Dalaff et al. "A Traffic Object Detection System for Road Traffic Measurement and 1-20 Management," Institute of Information Sciences and Technology, Massey University [Hrsg.]: IVCNZ Image+ Vision computing 03, S, IVCNZ Image+ Vision computing 03, [retrieved on Jun. 22, 2019]. Retrieved from the Internet: <URL: http://citeseerx.ist.psu.edu/viewdoc/summary? doi=10.1.1.113.596> pp. 78-83.

International Search Report and Written Opinion dated Jul. 10, 2019 in related foreign application No. PCT/US2019/029723, 69 pgs.

* cited by examiner

BROADCASTING DETAILS OF OBJECTS AT AN INTERSECTION

CROSS-REFERENCE TO RELATED APPLICATIONS

The present application claims priority benefit of U.S. provisional patent application No. 62/664,029 filed Apr. 27, 2018, the disclosure of which is incorporated by reference herein.

BACKGROUND OF THE INVENTION

1. Field of Invention

The present disclosure generally relates to a smart traffic camera system. More specifically the present disclosure relates to identifying and resolving discrepancies that may be related to a traffic system or autonomous vehicle.

2. Description of the Related Art

Ever-increasing traffic has been a serious problem faced by drivers as travel times have considerably increased due to increased traffic. In peak hours, existing infrastructure fails to cope with the heavy traffic, leading to long traffic congestions. Furthermore, traffic situations—such as pedestrian movement at the intersection, emergency vehicle movement, or a road accident—may also affect the movement of the traffic. In addition, at busy intersections, the traffic movement remains congested for most of the time.

Vehicles equipped with onboard computing systems for navigating the vehicles are of great interest nowadays. Driverless cars, also known as autonomous vehicles can sense their environment as they navigate from one place to another. Such vehicles may navigate with minimal or no input from a human occupant of a vehicle. Commonly environment that surround such autonomous vehicles use sensors to sense objects located near an autonomous vehicle. Sensor used by autonomous vehicles may include, optical sensors, radar, global positioning system (GPS) sensors, lasers, or light assisted radar. Generally, an onboard computing system equipped in the vehicle receives inputs from different sensors and like technologies. Based on these inputs, onboard vehicle computing systems can navigate the vehicle with minimum or no input from a human. However, navigating the vehicle in congested traffic situations and at intersections or in low light conditions still present challenges to onboard computing systems.

As such, there is a need to improve both the function of autonomous navigation and to improve communications between autonomous vehicles and traffic control systems.

SUMMARY OF THE PRESENTLY CLAIMED INVENTION

The presently claimed invention may be implemented as a method, a non-transitory computer readable storage medium, or apparatus that identify discrepancies associated with different sets of data that were acquired at a roadway. Methods consistent with the presently claimed invention may include receiving roadway image data from a camera, identifying an object and a first location of the object from the received image data, receiving sensor data from a sensing device, identifying the object and a second location of the object from the received sensor data, and initiating a corrective action after a discrepancy has been identified when the first and the second locations do not match.

When the presently claimed method is implemented as a non-transitory computer readable storage medium, a processor executing instructions out of a memory may implement methods consistent with the present disclosure. Here again the method may include receiving roadway image data from a camera, identifying an object and a first location of the object from the received image data, receiving sensor data from a sensing device, identifying the object and a second location of the object from the received sensor data, and initiating a corrective action after a discrepancy has been identified when the first and the second locations do not match.

Apparatus consistent with the present disclosure may include a camera that acquires roadway image data, a memory, and a processor. The processor at such an apparatus may execute instructions out of the memory when an object and first location of that object are identified and identify the object and a second location of that object from received sensor data. The processor may then identify that the first and the second location do not match and may initiate a corrective action based on the identification that the first location and the second location do not match.

DETAILED DESCRIPTION

Methods and apparatus consistent with the present disclosure may receive different sets of image or sensor data that may be compared for inconsistencies. Each of these sets of received data may include images of a roadway or intersection that are processed to identify objects and object locations at or near the roadway/intersection. In certain instances data received from a camera at a traffic control system may be compared with data received from a computer at a vehicle. Alternatively or additionally, different sets of data acquired by a same or by different cameras may be compared for discrepancies. When one or more discrepancies are identified in different sets of received data, corrective actions may be initiated. In certain instances, such corrective actions may include recalibrating an image acquisition system or may include sending a message to a vehicle computer that identifies the discrepancy.

Figure 1:
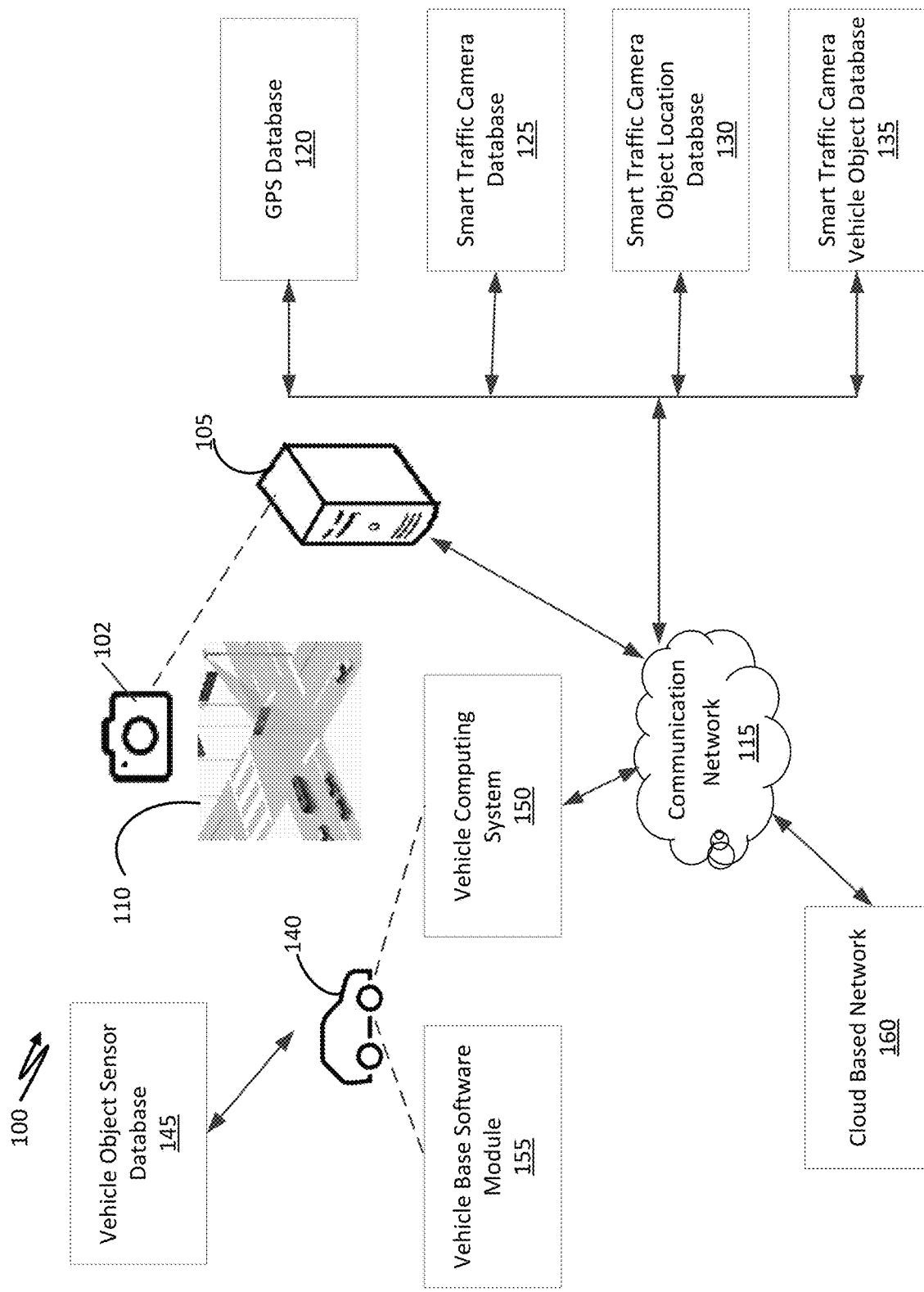
FIG. 1 illustrates a roadside computer that may send communications regarding traffic conditions to a computer at a vehicle.

FIG. 1 illustrates a roadside computer that may send communications regarding traffic conditions to a computer at a vehicle. The system 100 of FIG. 1 includes camera 102 that may acquire and provide image data to computer 105 as vehicle 140 moves through intersection 110. Computer 105 may communicate with vehicle 140 computer/computing system 150 over communication network 115. Computer 105 may communicate with a GPS database 120, a smart traffic camera database 125, a smart traffic camera location database 130, and a smart camera vehicle object database 135. While computer 105 is illustrated as communicating with databases 120, 125, 130, and 135 via communication network 115, any of these databases may alternatively be located at computer 105. Alternatively databases 120, 125, 130, and 135 may reside at cloud based network 160. Computer 105 may store information in any of these databases after image data of an intersection have been captured and analyzed.

GPS database 120 may be used to store information that associates specific grid cells to respective unique locations. Smart traffic camera data base 125 may be used to store calibration information, information that may be used to calculate distances between different objects, or information that may be used to identify particular types of objects. Smart traffic camera object location database 130 may be used to store relative or absolute locations of various different objects at an intersection after different objects have been identified. Smart traffic vehicle object database 135 may be used to store information that identifies dates, times, and locations of particular vehicles as those vehicles move through an intersection. Information included in these various different databases may be used to cross-reference the position of particular object relative to particular vehicles. The information stored in these different databases may also be used to store information captured by different cameras or sensors over time. Information stored in these databases may also be used to identify how fast certain vehicles moved through an intersection.

While a single camera 102 is illustrated in FIG. 1, systems consistent with the present disclosure may include multiple cameras like camera 102. In certain instances, computer 105 may collect data from a plurality of cameras that may be located at an intersection or that may be located at a plurality of different intersections. After camera 102 provides image data of an intersection to computer 105, computer 105 may partition that intersection data into a plurality of squares (or cells) that form a grid, where each individual cell may be associated with a unique location at the intersection. In certain instances, these squares or grid cells may allow distances to be estimated by computer 105. As such, computer 105 may also identify objects and approximate distances between respective objects at the intersection using the grid pattern. In certain instances, images form two cameras or two different sensing apparatus may be used to generate a stereoscopic view of a roadway or intersection. In such an instance, data from this stereoscopic view may be used when distances between objects are calculated.

Examples of objects near or at a roadway or intersection include, yet are not limited to pathways, foot paths, people, animals, plants, trees, benches, vehicles, bus stops, signs, and traffic signals.

Vehicle computer 150 may store program code associated with the operation of vehicle base software module 155 and computer 150 may store data in vehicle object sensor database 145 of FIG. 1 that was sensed by one or more sensors at vehicle 140. Traffic computer 105 and camera 102 may be part of a system that broadcasts details of objects to vehicle computer 150 or traffic computer 105 may receive data acquired by sensors at vehicle 140. Program code associated with vehicle base software module 155 may be executed by a processor at vehicle computer 150 as vehicle 140 moves down a street. Functions that may be performed by vehicle base software module 155 may include collecting and processing information sensed by one or more proximity sensors at vehicle 140. Vehicle computer may use this sensor data to calculate relative distances between a vehicle and respective objects located around an intersection. This relative distance information may then be sent to traffic computer 105 for additional computations or comparisons.

After traffic computer 105 receives sensor data or object location data from vehicle computer 150, traffic computer 105 may identify distances between the various object at an intersection using image data acquired by camera 102. Computer 105 may then identify whether distance data associated with the images acquired by camera 102 are consistent with relative distance data received from vehicle computer 150. When computer 105 identifies differences in a distance data associated with images captured by camera 102 and with the relative location data received from vehicle computer 102, computer 150 may recalibrate its camera system in an attempt to eliminate discrepancies associated with the different sets of location data. Alternatively or additionally, computer 105 may send a message vehicle computer 140 that informs vehicle computer 140 of the discrepancy. In instances when a particular vehicle computer receives discrepancy information from numerous (greater than a threshold number of) different traffic computers over a time span, vehicle computer 150 may identify that sensors at vehicle 140 should be recalibrated. In such an instance computer 150 may provide a warning message to a driver of vehicle 140 that recommends that vehicle 140 be serviced.

In certain instances, traffic computer 105 may collect different data sets from various different cameras. Here traffic computer 105 may compare data associated with a first camera with data associated with a second camera when identifying whether the different sets of camera data are inconsistent. When traffic computer does identify that the different data sets include inconsistent information, computer 105 may perform a calibration function to eliminate this inconsistency.

Communication network 115 may allow traffic computer 105 or vehicle computer 150 to send data to or receive data from cloud-based network 160. In certain instances, embodiments of the present invention may be implemented in cloud-based network 160. For example, one or more databases may be stored in the cloud-based network 160. Furthermore, communication network 115 may be a wired and/or a wireless network, but preferably a wireless network. The communication network 115, if wireless, may be implemented using communication techniques such as visible light communication (VLC), worldwide interoperability for microwave access (WiMAX), long term evolution (LTE), wireless local area network (WLAN), infrared (IR)

communication, public switched telephone network (PSTN), radio waves, and other communication techniques known in the art.

In certain instances, vehicle 140 may be an automotive vehicle having advanced navigation technologies. For example, automotive vehicles equipped with advanced computing technologies that can sense the surrounding environment and this information may allow a vehicle to drive itself to a destination. In such instances, vehicle 140 may or may not receive human input for navigating the vehicle. Examples of vehicle 140 may include, but not limited to autonomous vehicles, smart vehicles, and driverless vehicles.

In example, the computer 105 may identify details of objects at an intersection, using information collected by camera 102. Computer 105 may then broadcast these details to vehicles arriving at an intersection. Such details obtained from the computer 105 may aid the vehicle in navigation at the intersection. For example, the details may allow the vehicle to recognize objects that are not recognized by the vehicle itself.

As mentioned above, computer 105 may also communicate with the onboard computing system 150 of vehicle 140 to receive object sensor data from the vehicle. The object sensor data may relate to the positions of objects in close proximity to vehicle 140. Vehicle 140 may sense its environment using different technologies equipped in the vehicle. As such, vehicle 140 may use proximity sensors or radar to sense the presence of nearby objects. Such sensing technologies could provide a kind of computer vision to vehicle 140 for navigating to a destination. Such computer vision systems may recognize objects in proximity near vehicle 140 and may identify how far certain specific objects are from vehicle 140. In one instance, distances between objects may be identified using GPS coordinates. Computer 105 may receive such details from the vehicle 140 to identify whether traffic system 100 is currently operating using faulty information. For example, faults associated with identifying a type of objects or a precise location of an object may be identified. Also, these details may be used by the computer 105 for initiating a self-calibration function.

In one instance, the system 100 may be a part of a smart traffic control system. In certain instances, system 100 may function as an independent entity. Alternatively computer 105 may be part of an existing traffic control system that receives traffic signal timing schedule data from a plurality of different intersections. Such traffic signal timing schedule data may be broadcasted to vehicles along with information that identifies objects or the location of objects at an intersection. Additionally, camera 102 may be a part of the smart traffic control system that includes multiple cameras controlled by one or more computer systems. Any suitable camera may be used according to the present invention. Camera 102 may be installed on the side of a road to capture the objects on the road. Also, more than one camera 102 may be installed at an intersection. Methods and apparatus consistent with the present disclosure may be implemented for use at any other portion of a roadway. For example, a congested stretch of a road, where the system 100 may aid a vehicle to navigate a congested stretch of roadway.

Figure 2:
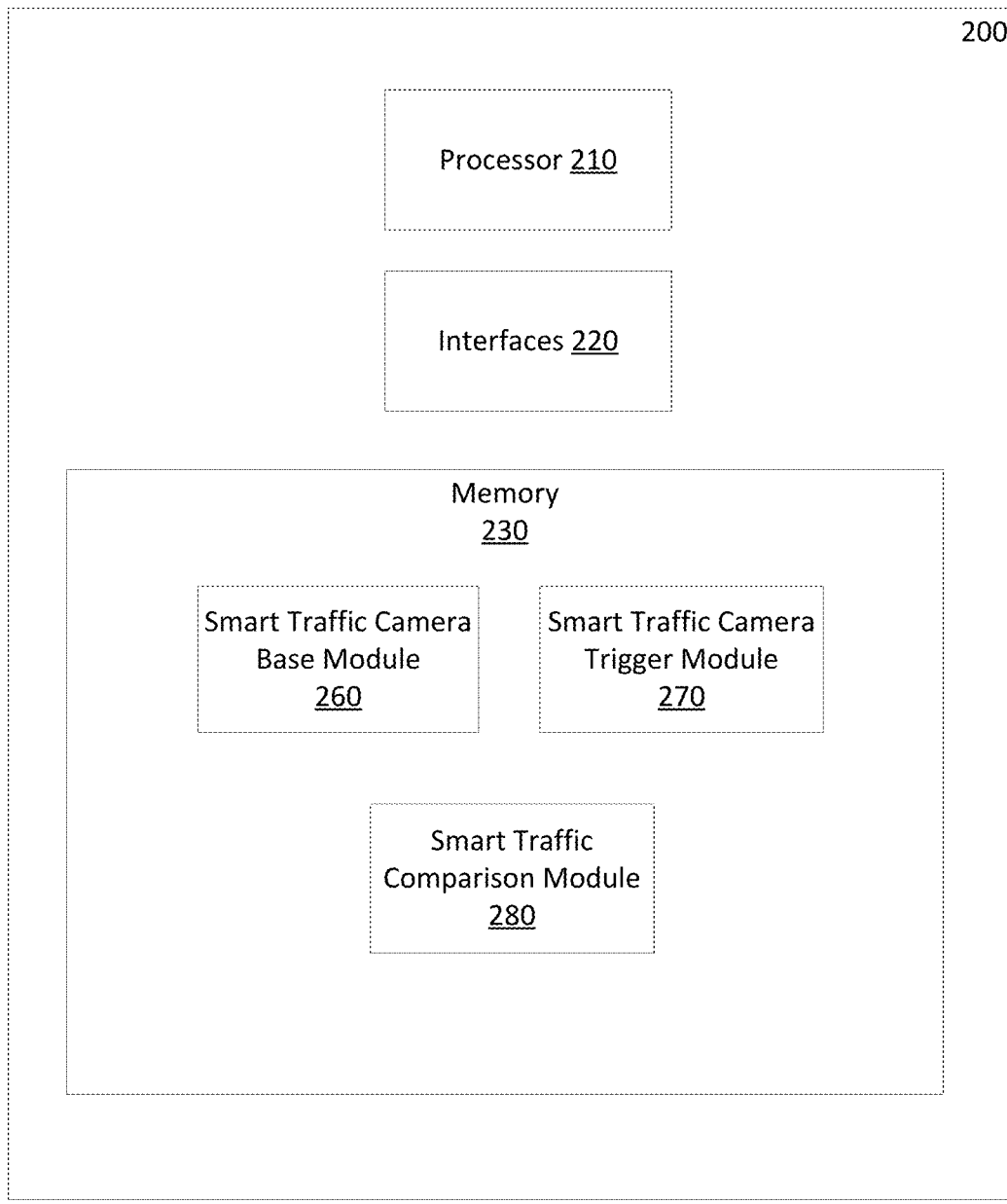
FIG. 2 illustrates hardware components and software program code modules that may be used to receive and analyze roadway image data.

FIG. 2 illustrates hardware components and software program code modules that may be used to receive and analyze roadway image data. The hardware and software components of computer 200 of FIG. 2 may implement functionality consistent with computer 105 of FIG. 1. Computer 200 includes processor 210, interfaces 220, and memory 230. Memory 230 may store program code executable by processor 210 to perform tasks associated with smart traffic camera base software module 260, smart traffic camera trigger software module 270, and smart traffic comparison software module 280.

Smart traffic camera base software module 260 may include program code executable by a processor to calibrate a visual data acquisition system when images of a roadway or intersection are acquired. Acquired image data may be divided into a grid pattern that includes a series of boxes or cells. Visual acquisition systems consistent with the present disclosure may identify objects and object location in the image data and may identify apparent faults or discrepancies in acquired image data. Program code associated with smart traffic camera base software module 260 may work in conjunction with smart traffic camera trigger software module 270 and smart traffic comparison software module 280 when performing functions consistent with the present disclosure. Smart traffic camera trigger software module 270 may include program code that identifies a vehicle in acquired image data, may communicate with a computer at a vehicle to receive/store or process data acquired by a camera or sensor. program code associated with smart traffic comparison software module 280 may be used to identify differences in various sets of acquired images when identifying discrepancies in different sets of acquired data or processed data that include a same set of objects.

In operation processor 210 may execute instructions out of memory 230 when the smart traffic camera base software module 260 receives image data that includes a vehicle and an object at an intersection from a camera. Smart traffic camera trigger software module 270 may be used to receive sensor data from sensors that also detect the presence of the vehicle and the object at the intersection. This acquired image and sensor data may then be provided to safe traffic comparison software module 280 and instructions of the software module 280 may be used by processor 210 to identify relative locations of the vehicle and the object using both the camera image data and the sensor data. After these relative object locations have been identified, they may be compared to identify any discrepancies associated with estimated locations of various specific objects at a roadway. Once a discrepancy has been identified, actions may be initiated that mitigate a possible negative outcome associated with misidentifying a true location of particular objects. As such, the operation of the different software modules stored in memory 230 of computer 200 may help resolve errors or faults that may be associated with a camera or a sensor system.

Processor 210 may also be configured to decode and execute any instructions received from one or more other electronic devices or server(s). The processor 210 may include one or more general-purpose processors (e.g., INTEL® or Advanced Micro Devices® (AMD) microprocessors) and/or one or more special purpose processors (e.g., digital signal processors or Xilinx® system-on-chip (SOC), field programmable gate array (FPGA) processor). The processor 210 may be configured to execute one or more computer-readable program instructions. In certain instances processor 210 may compare data acquired by a camera at an intersection as processor 210 receives data via interface 220 that was transmitted from a computer at a vehicle (e.g. from vehicle computer 150 of FIG. 1) and computer 210 may send instructions to the vehicle computer such that the vehicle can safely avoid hitting an object at the intersection.

The interface(s) 220 may include communication interfaces and may include command interfaces that allow a person to interact with computer 200. Interface(s) 220 of the traffic control system 102 may accept an input from the operator or provide an output to the operator, or may perform both of these actions. Interface(s) 220 may include a command line interface (CLI), a graphical user interface (GUI), or a voice interface. When a voice interface is used, processor 210 may execute software out of memory 230 that performs a speech recognition function. Interfaces 220 may also include menu driven interactions, text interfaces, keyboard shortcuts, pointers, scripts, or a control panel that an operator can use to configure traffic control computer 200.

Memory 230 may include any form of memory. As such, memory 230 may include, hard disk drives, FLASM memory, magnetic tape, floppy diskettes, optical disks, compact disc read-only memories (CD-ROMs), magneto-optical disks, semiconductor memories, such as ROMs, random access memories (RAMs), programmable read-only memories (PROMs), erasable PROMs (EPROMs), electrically erasable PROMs (EEPROMs), magnetic cards, optical cards, or other type of media/machine-readable medium suitable for storing electronic instructions....

Figure 3:
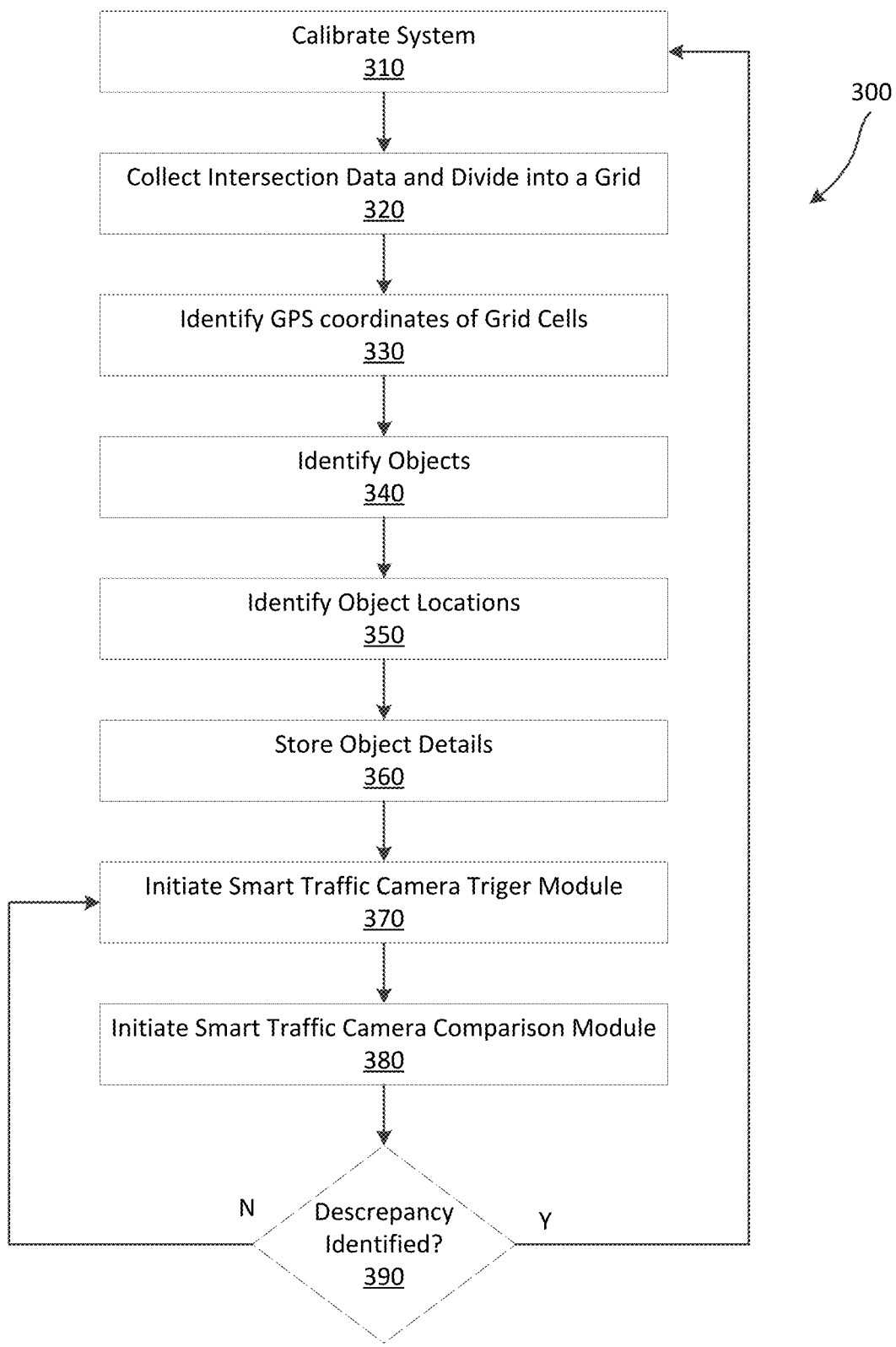
FIG. 3 illustrates a set of steps that may be executed by a traffic control computer when that computer detects objects located at or near an intersection or roadway.

FIG. 3 illustrates a set of steps that may be executed by a traffic control computer when that computer detects objects located at or near an intersection or roadway. The flow chart 300 of FIG. 3 begins with step 310 where data acquisitions sensors or cameras located at an intersection may be calibrated. Such a calibration process may include acquiring images of various different signs at an intersection that are located at different known distances from a camera. Since the various different signs are located at known distances from the camera, coefficients—variables—or offsets used in calculations associated with identifying distance from image data may be adjusted during this calibration process. For example, when image data is processed from a sign that is known to be 20 feet away from a particular camera and when distance calculations identify that the sign appears to be 22 feet away from the camera, a coefficient or variable used in the distance calculation may be modified such that the calculation correctly identifies that the sign is 20 feet away from the camera. Alternatively or additionally, other types of sensors may be used and calibrated in step 310 of FIG. 3. These other types of sensors may include radar, LIDAR, pressure, or optical sensors, for example.

After calibration step 310, image data associated with the intersection may be collected in step 320, the acquired image may be divided into a grid that includes a plurality of boxes or cells. Each of these grid cells may be associated with a different unique location at an intersection in step 330. Each of these grid cells may be also associated with a distance from a camera or sensor that was used to acquire image data in step 330. The location data identified in step 330 may include global positioning (GPS) data. As such, locations associated with each of the grid cells may be assigned a different GPS location. Alternatively, locations of particular grid cells may be relative to one or more reference points at a roadway. A processor executing instructions out of a memory may then identify objects at the intersection in step 340 of FIG. 3. Next, locations for each of these objects may be identified in step 350.

After objects have and their locations have been identified, detailed information regarding these objects and object locations may be stored in a memory or database in step 360. The details stored in the memory may identify that a first object is a bus that is located a first position and that a second object is a tree that is located at a second position at an intersection. After received object data is stored, a processor may begin executing program code consistent with the smart traffic camera trigger module in step 370 and this trigger module 370 may collect information regarding the presence of the objects that were identified in step 340. The information collected by the trigger module 370 may be a second image collected by a same camera or may include data collected by a different camera or sensor. After at least two different sets of image data have been acquired, locations of objects located in these different sets of image data may be compared after operation of program code of a smart traffic comparison module is initiated in step 380 of FIG. 3. Note that operations of the smart traffic camera trigger module in step 370 and the smart traffic comparison module in step 380 may be consistent with the smart traffic camera trigger software module 270 and the smart traffic comparison software module 280 of FIG. 2.

After step 380, determination step 390 may identify whether data from a first set of acquired images is not consistent (discrepant) with data from the second set of acquired images. When a discrepancy has been identified program flow may move back to step 310 where cameras or sensors associated with a traffic control system are recalibrated. When determination step 390 does not identify a discrepancy, program flow may move back to step 370 and then to step 380 of FIG. 3 as additional sets of data may be acquired and compared for discrepancies.

Figure 4:
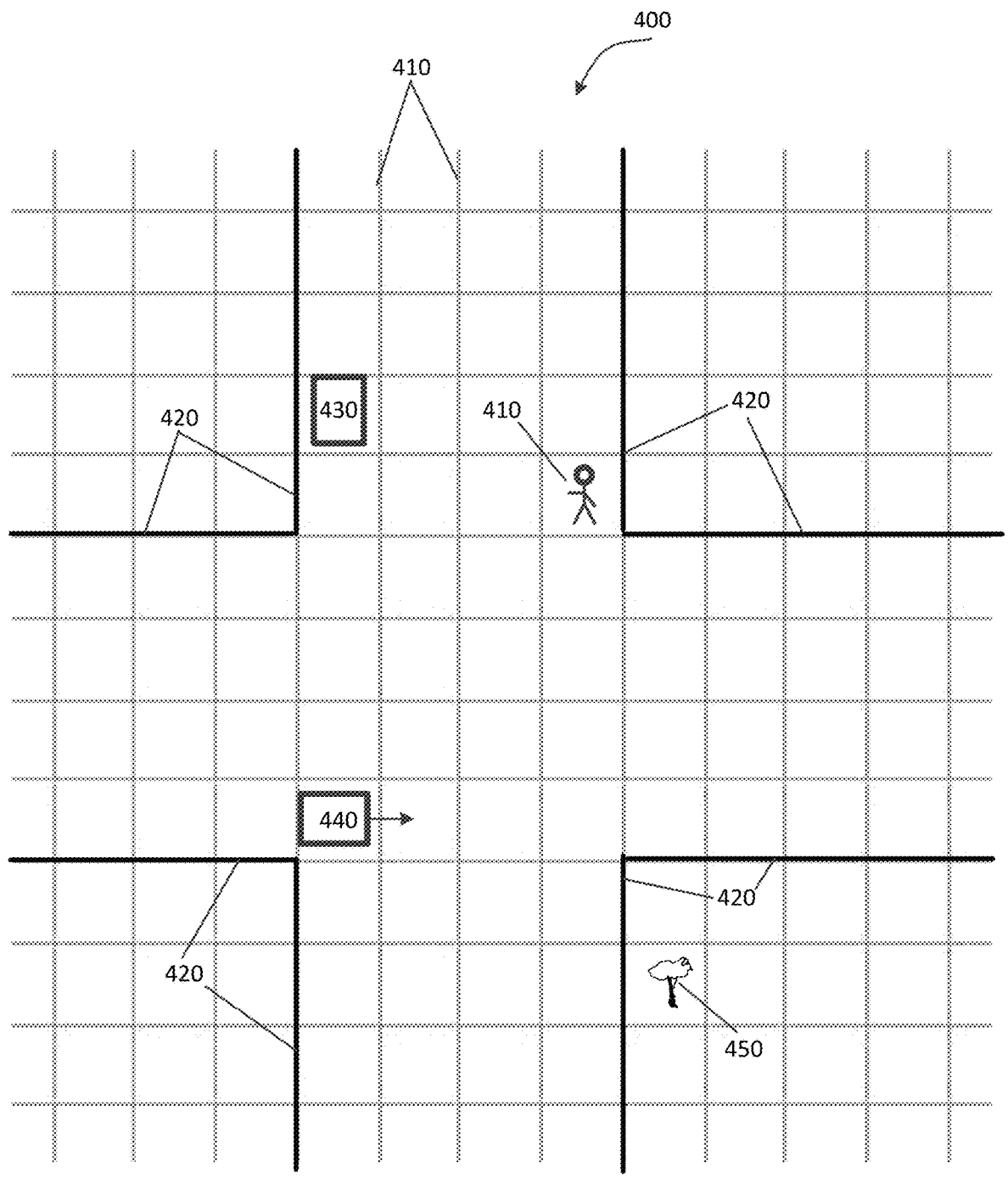
FIG. 4 illustrates an image of an intersection that has been divided into a grid pattern by a computer that cross-references the location of objects at the intersection with location of the grid pattern.

FIG. 4 illustrates an image of an intersection that has been divided into a grid pattern by a computer that cross-references the location of objects at the intersection with locations of the grid pattern. Note that the grid pattern of FIG. 3 includes gray lines 410 that form a series of squares that may be referred to as grid cells. Intersection 400 of FIG. 4 includes a person 410, curbs 420, car 430, car 440, and tree 450. The grid pattern illustrated in FIG. 4 may have been generated by a processor executing program code consistent with step 320 of FIG. 3.

Here again the smart traffic camera base module 260 of FIG. 2 may have collected an image of an intersection and that image data may have been divided into the grid pattern of FIG. 4. Each of the grid cells in FIG. 4 may be associated with a location (e.g. a GPS location), where each of these grid cells may be of a uniform size. For example, each grid cell may have a size of 1 foot by 1 foot. Different images acquired by camera may be timestamped by a processor executing program code consistent with smart traffic camera base module 260 of FIG. 2.

Thereafter, the smart traffic camera base module 260 of FIG. 2 may recognize different objects present in the image. These objects may be recognized using suitable image pattern recognition algorithms known in the art may be used. For example, the system may recognize the vehicles, pedestrians, and road signs present in the image. Further, positions of the recognized objects may identify by the smart traffic camera base module 260. The positions may be identified in the form of GPS coordinates. Alternatively, the positions of the objects may be identified in relation to distance from reference objects or grid cells. Objects that may be identified in FIG. 4 include pedestrian 410, curbs 420, vehicles 430 & 440, and tree 450. Note that the image of the intersection may have acquired by camera 102 of FIG. 1 and this image data may have been processed by computer 105 of FIG. 1 when processor 210 of FIG. 2 executes program code consistent with the steps illustrated in FIG. 3.

In an example, the present and location of vehicle 430 may be identified by the smart traffic camera base module 260 of FIG. 2. The grid cells may further allow relative positions of vehicle 430 and pedestrian 410 to be identified as pedestrian 410 crosses intersection 400. The details of the objects identified by smart traffic camera base module 260 may be stored as metadata associated along with image data. This metadata may include timestamps, relative positions, or other information. Metadata may also be used to identify when relative distances reach a measure of zero distance. A relative distance of zero may indicate that a pedestrian has successfully crossed the street without incident, for example, when a relative distance between a pedestrian and a curb have reach zero. In another example, when relative distances between a pedestrian and a vehicle reaches zero, an accident could have occurred or that pedestrian could have entered the vehicle.

The smart traffic camera base module 260 of FIG. 2 may also determine movement details of various objects illustrated in FIG. 4. Movement details of the objects may be identified by comparing two or more images captured in over a time interval, where each image includes an object in a different grid cell. The comparison of two or more images may allow changes in positions of an object over time. In certain instances, changes in the GPS coordinates of a moving object may be used to identify movement details of the object. These GPS coordinate changes of the object may also be used to determine velocity of the object. The movement and related details of objects at an intersection may also be stored as metadata associated with the image. As such, the details of objects identified by methods and systems consistent with the present disclosure may be stored in traffic camera object location database 130 of FIG. 1.

Figure 5:
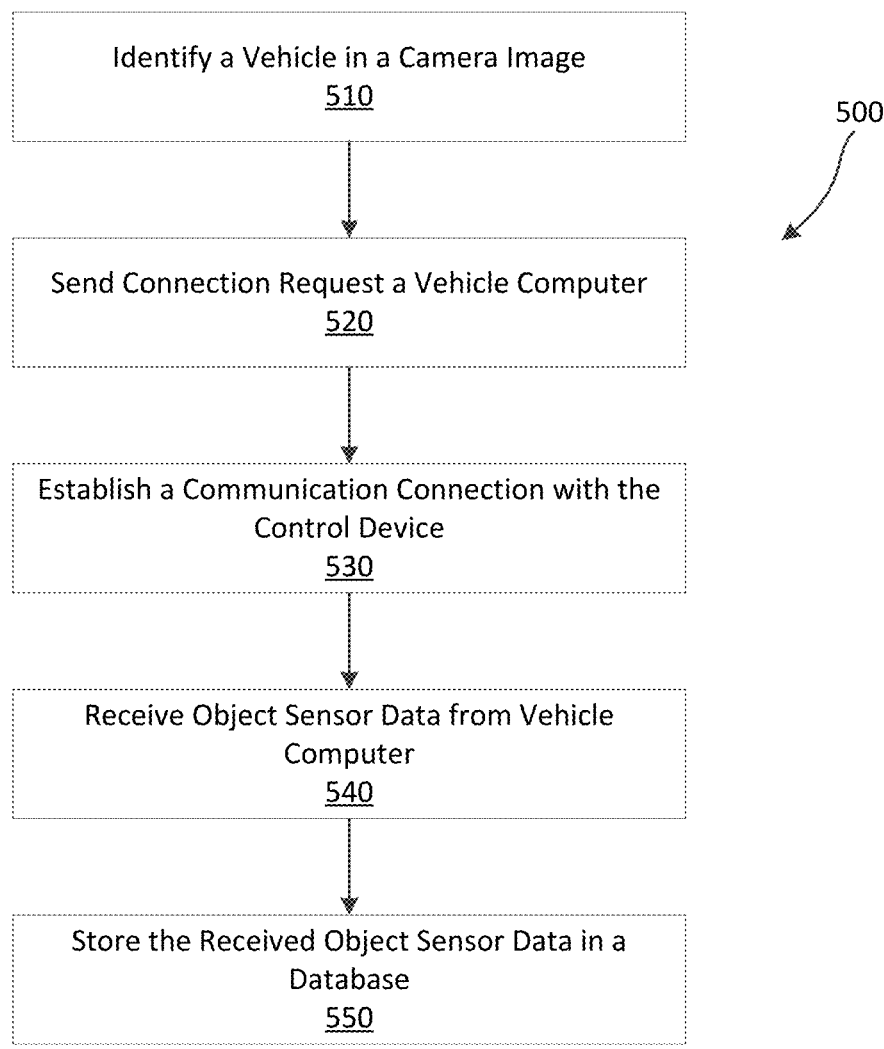
FIG. 5 illustrates functions that may be performed when an intersection control computer communicates with a computer at a vehicle.

FIG. 5 illustrates functions 500 that may be performed when an intersection control computer communicates with a computer at a vehicle. The various steps illustrated in FIG. 5 may be performed by computer 105 of FIG. 1 or by the computer 200 of FIG. 2 when those computers execute instructions consistent with the smart traffic camera trigger module 270 of FIG. 2 are executed. In such an instance camera 102 of FIG. 1 may capture an image of vehicle 140 in step 510 of FIG. 5. Next, traffic control computer 105/200 may then send a communication connection request to vehicle computer 150 of FIG. 1 in step 520. After the communication request has been sent in step 520, communications between the traffic control computer 105/200 and vehicle computer 150 may proceed in step 530. In certain instances, vehicle computer 150 may reject the communication request.

In an instance where a communication connection between traffic control computer 105 of FIG. 1 or computer 200 of FIG. 2 and vehicle computer 150 are established, program code associated with the smart traffic camera trigger module 270 may be used to receive object sensor data in step from vehicle computer 150 in step 540 of FIG. 5. This object sensor data may be related to the objects surrounding a particular vehicle, where this object sensor data may include position data of the one or more objects surrounding the particular vehicle. In one instance, object positions may be relative positions or these objection positions may be identified by GPS coordinates. In such instances, a relative position may identify that a pedestrian is located ten feet south of a first vehicle located at an intersection. After step 540, the received object sensor data may be stored in the object location database 130 of FIG. 1 in step 550. This stored object sensor data may also include metadata that identifies a time when that sensor data was captured.

Figure 6:
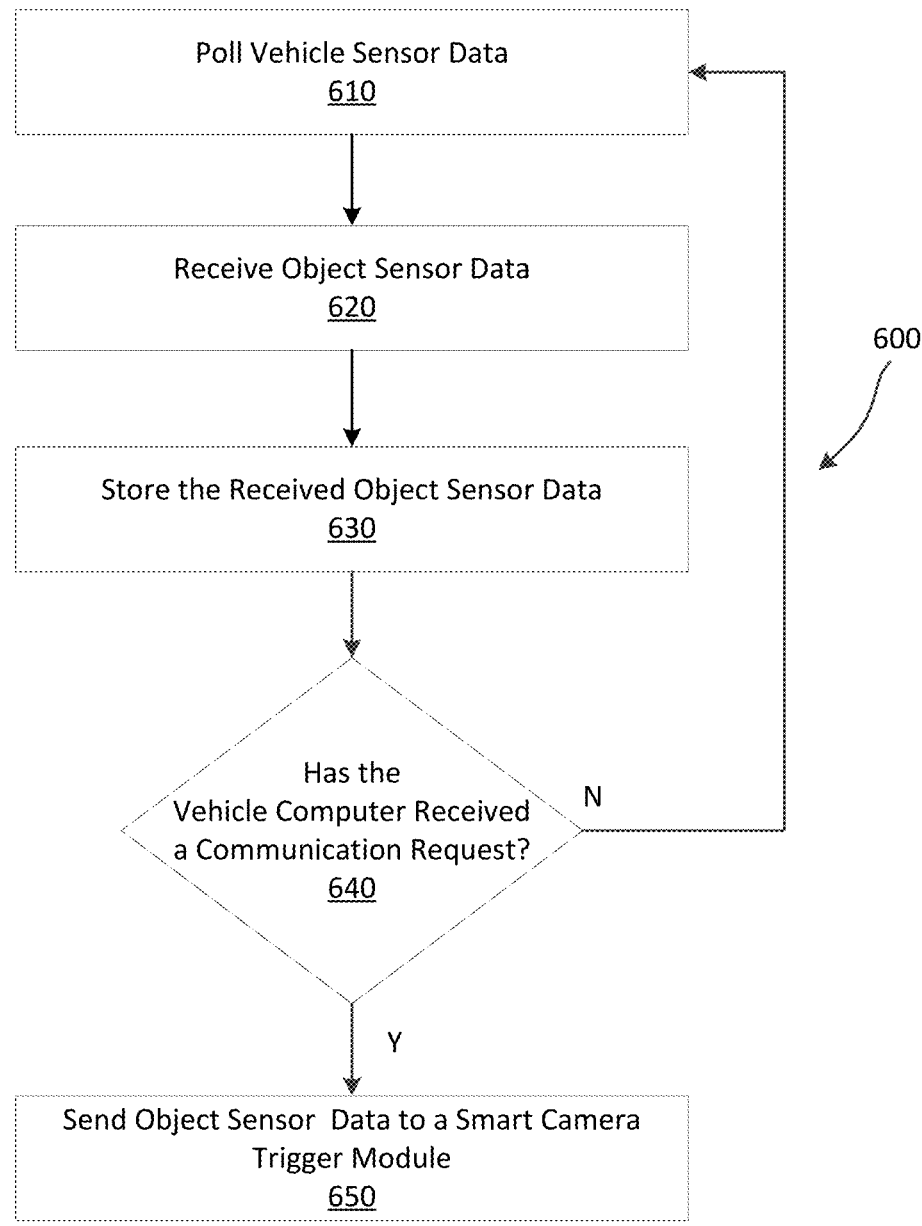
FIG. 6 illustrates exemplary steps of program code that may be executed by a computer at a vehicle.

FIG. 6 illustrates exemplary steps of program code that may be executed by a computer at a vehicle. The program code illustrated in FIG. 6 may be consistent with functions consistent with vehicle base software module 155 of FIG. 1. The flow chart 600 of FIG. 6 begins with step 610 where sensors are polled for data. After step 610, sensor data may be received by the vehicle computer 150 of FIG. 1 in step 620 of FIG. 6. The sensor data received in step 610 may be received from sensors that detect the proximity of objects to vehicle 140 of FIG. 1, for example. Next, in step 630, the received sensor data may be stored with associated timestamps in the vehicle object sensor database 145 of FIG. 1.

Determination step 640 may then identify whether a communication request has been received by the vehicle computer. When a communication request has not been received, program flow may move from step 640 back to step 610 of FIG. 6. When step 640 identifies that a communication request has been received program flow may move from step 640 to step 650 where object sensor data may be sent to the smart camera trigger software module 270 of FIG. 2 when performing functions consistent with the steps of FIG. 3. After step 650 of FIG. 6 program flow of FIG. 6 may end.

Figure 7:
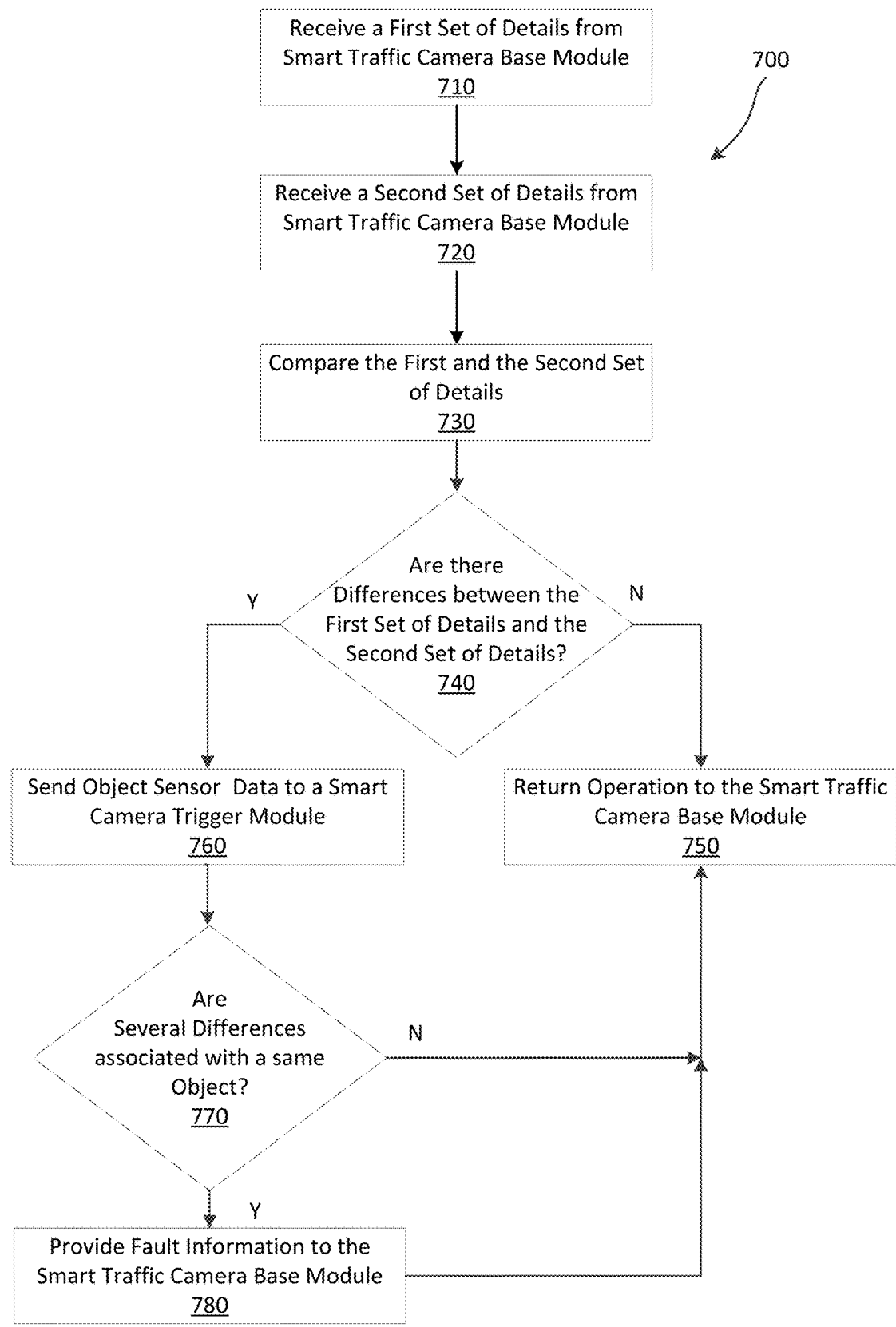
FIG. 7 illustrates a series of steps that may be performed by a traffic control computer that compares different sets of image or sensor data when identifying faults or discrepancies associated with received image or sensor data.

FIG. 7 illustrates a series of steps that may be performed by a traffic control computer that compares different sets of image or sensor data when identifying faults or discrepancies associated with received image or sensor data. The flow chart 700 of FIG. 7 begins with step 710 where a first set of details are received from a smart traffic camera base module like the base module 260 of FIG. 2. Steps associated with the flow chart 700 of FIG. 7 may be consistent with steps performed by the smart traffic comparison module 280 of FIG. 2. After step 710, a second set of details may be received from the smart traffic camera base module 260. The first and second set of details received respectively in step 710 and 720 of FIG. 7 may include identified object, object locations, and other information associated with a traffic intersection at a particular moment in time.

After step 730, the first and the second set of details may be compared in step 730 when identifying whether data associated with the first set of details are consistent with data associated with the second set of details. Determination step 740 may then identify any differences that may exist in the first set of details as compared to the second set of details. When the first and the second set of details do not include identifiable differences, program flow may move to step 750, where a processor at a traffic control computer 105/200 may return to executing instructions consistent with the smart traffic camera base module 260 of FIG. 2.

When determination step 740 identifies discrepancies in the first and second set of details, data associated with those discrepant details may be sent to the smart camera trigger module 270 of FIG. 2 in step 760. Program flow may then move to determination step 770 that identifies whether several of the identified differences are associated with a same object. Determination step 740 may also identify objects responsible for the difference. In an example, when step 730 identifies several differences in object data, the comparison module 280 could identify whether a number of differences are greater than a threshold level. For example, when the discrepancies are associated with a location or timing error, a series of discrepancies (e.g. 5 discrepancies) relating to a true location of a vehicle at a point in time may be identified in determination step 770. Next, fault information may be provided to the smart traffic camera base module 260 of FIG. 2 in step 780 of FIG. 7, where a calibration may be performed by instructions associated with the base software module 260 of FIG. 2 to resolve these discrepancies or faults. In an instance where several of the identified differences are not associated with a same object program flow may move from step 770 to step 750 that was previously discussed.

Differences detected by operation of comparison module 280 may be related to differences in locations of particular stationary objects from images that were captured by different cameras. Furthermore difference in position of a moving object may be associated with a timing or location of that object relative to timestamps received from these different cameras. In such an instance, differences in dock settings at one camera or sensor versus another may be used to identify that the differences are associated with a timing error at a particular camera.

Alternatively or additionally, the steps of FIG. 7 may be used to compare data received by an intersection camera with data received from vehicle computer 150 of FIG. 1. In such an instance, a distance between a stationary object and a vehicle may be identified from image data captured by camera 102. This distance may also be identified by vehicle computer 150 after computer 150 receives data from a proximity sensor at vehicle 140. In this instance, the distance determined by the smart traffic camera base module 260 of FIG. 2 may be 5 units, while the distance obtained from the vehicle computer 150 may be 7 units. Such difference of 2 units may indicate a fault in the traffic system of FIG. 1. Here again corrective actions may include recalibrating components of a traffic control system or may include informing a vehicle computer of the discrepant data.

Figure 8:
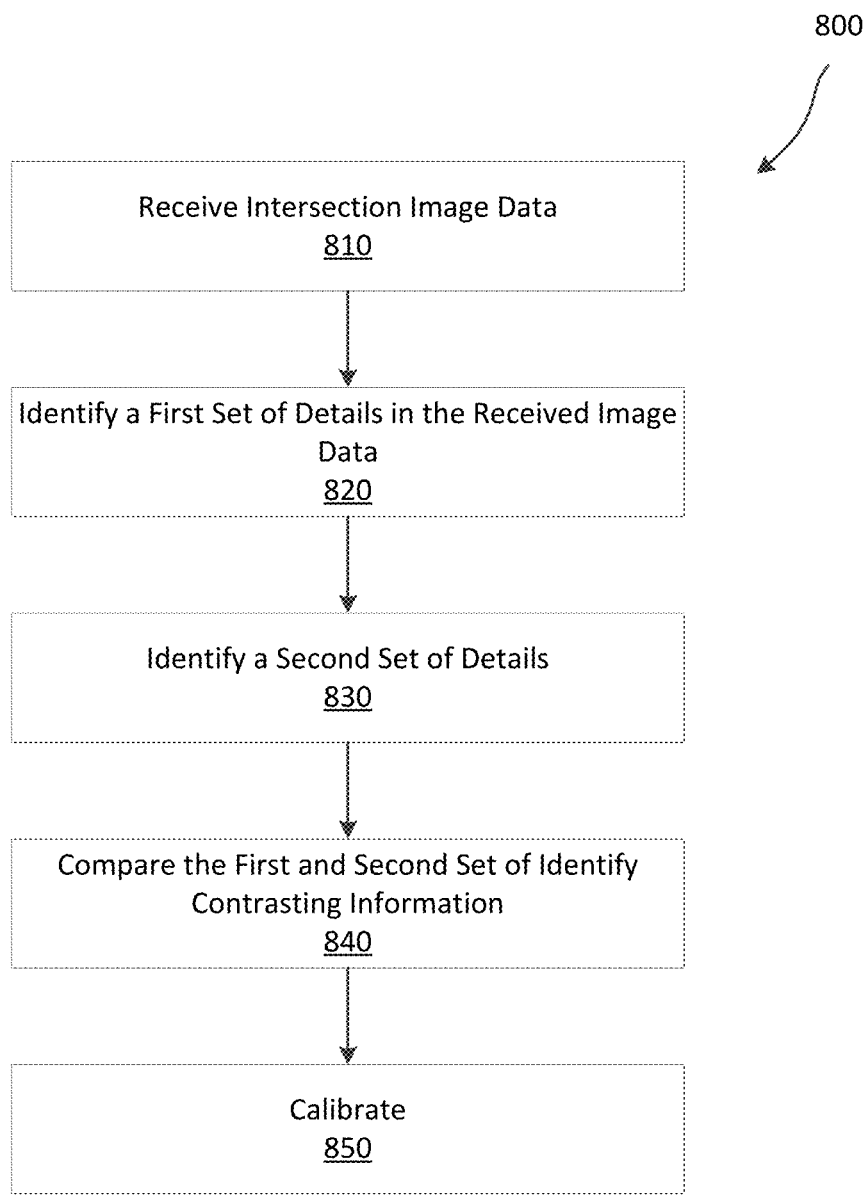
FIG. 8 illustrates steps of a flow chart that may receive and compare sets of sensed data and that may perform a calibration function based on the different sets of received data.

FIG. 8 illustrates steps of a flow chart that may receive and compare sets of sensed data and that may perform a calibration function based on the different sets of received data. The steps performed in flowchart 800 of FIG. 8 may be calibration steps performed in step 310 of FIG. 3. First, in step 810 image data of an intersection may be received. This received image data may be analyzed to identify a first set of details in the first received image in step 820.

As mentioned previously, a calibration function may include identifying signs located at a known distance from a camera of a traffic control system. Here the first set of details may relate to a calculated distance from the camera to a first sign and the second set of details may relate to a calculated distance from the camera to a second sign. For example, when such a comparison identifies that the first sign appears to be located 22 feet from the camera when this first distance is really 20 feet and when this comparison identifies that the second sign appears to be 36 feet from the camera when this second distance is really 30 feet a determination can be made that the camera is acquiring distorted images. In such an instance, when computer 105 of FIG. 1 or computer 200 of FIG. 2 identifies image distortion, calculations of distances of approximately 22 feet from the camera should be reduced by about 9 percent and calculated distances of about 36 feet should be reduced by about 17 percent to account for distortion in the acquired image. In other instances, the comparisons performed in FIG. 8 may include comparing details that relate to positions of one or more objects relative to a vehicle position.

Figure 9:
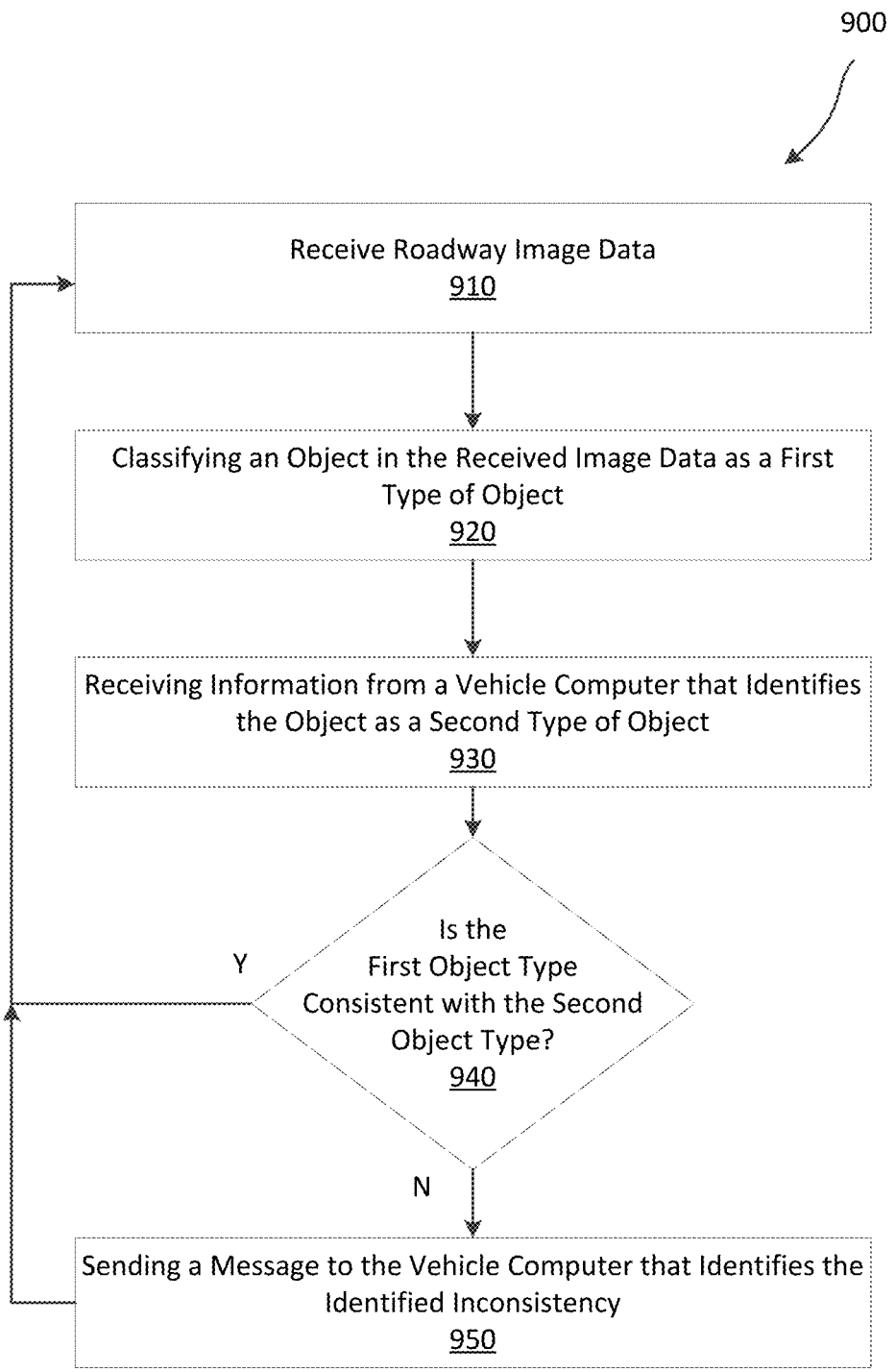
FIG. 9 illustrates steps that may identify that a first determination made by a first computer is inconsistent with a second determination made by a second computer.

FIG. 9 illustrates steps that may identify that a first determination made by a first computer is inconsistent with a second determination made by a second computer. The flow chart 900 of FIG. 9 includes a first step 910 where roadway image data is received by a first computer system (e.g. the computer system 105 of FIG. 1 or the computer 200 of FIG. 2). After the roadway image data is received, an object may be identified and classified in step 920 of FIG. 9. For example, this identification may indicate that a particular object is a pedestrian. Next, in step 930, information may be received from a computer at a vehicle (e.g. vehicle computer 150 of FIG. 1) that includes a classification of the same object as a second type of object (e.g. a tree branch). Determination step 940 may then identify whether the first object type is consistent with the second object type, when yes, program flow may move back to step 910 where another set of roadway image data is received. When determination step 940 identifies that the first and the second object types are not consistent, program flow may move to step 950 where a message is sent to the vehicle computer that identifies the inconsistency. The message sent to the vehicle computer may indicate that the object type identified by the first computer is a person and that this is discrepant with an object type included in the information received from the vehicle computer. This inconsistency, may inform the vehicle computer that determinations made at the vehicle computer may be incorrect. The vehicle computer may then provide an occupant of the vehicle with a warning message that indicates that the vehicle computer may need to be updated or recalibrated based on this identified discrepancy. In such an instance, the vehicle computer may provide the warning message to the vehicle occupant only after a threshold number of inconsistent object type identifications have been made. After step 950 of FIG. 9 program flow may move back to step 910 where additional sets of roadway image data may be acquired.

Figure 10:
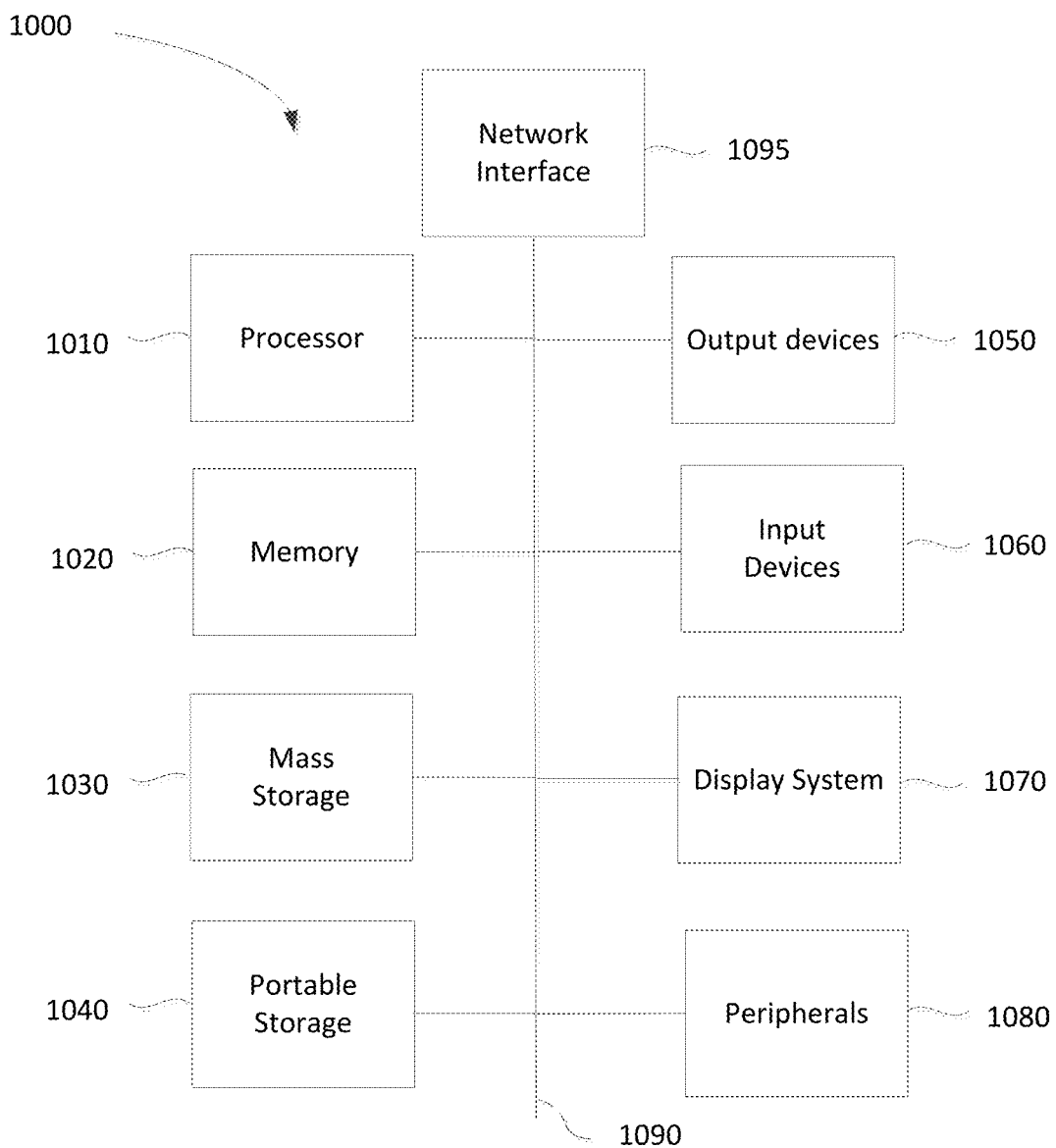
FIG. 10 illustrates a computing system that may be used to implement an embodiment of the present invention.

FIG. 10 illustrates a computing system that may be used to implement an embodiment of the present invention. The computing system 1000 of FIG. 10 includes one or more processors 1010 and main memory 1020. Main memory 1020 stores, in part, instructions and data for execution by processor 1010. Main memory 1020 can store the executable code when in operation. The system 1000 of FIG. 10 further includes a mass storage device 1030, portable storage medium drive(s) 1040, output devices 1050, user input devices 1060, a graphics display 1070, peripheral devices 1080, and network interface 1095.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1020.

Portable storage device 1040 operates in conjunction with a portable non-volatile storage medium, such as a FLASH memory, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD), a plasma display, an organic light-emitting diode (OLED) display, an electronic ink display, a projector-based display, a holographic display, or another suitable display device. Display system 1070 receives textual and graphical information, and processes the information for output to the display device. The display system 1070 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1080 may include any type of computer support device to add additional functionality to the computer system. For example, peripheral device(s) 1080 may include a modem or a router.

Network interface 1095 may include any form of computer interface of a computer, whether that be a wired network or a wireless interface. As such, network interface 1095 may be an Ethernet network interface, a BlueTooth™ wireless interface, an 802.11 interface, or a cellular phone interface.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 1000 may in some cases be a virtual computer system executed by another computer system. Various operating systems can be used including Unix™, Linux™, Windows™, Macintosh™OS, Palm™OS, Android™, iOS™, and other suitable operating systems.

The present invention may be implemented in an application that may be operable using a variety of devices. Non-transitory computer-readable storage media refer any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital versatile disk (DVD), any other optical medium, RAM, PROM, EPROM, a FLASH EPROM, and any other memory chip or cartridge.

Some embodiments of this disclosure, illustrating all its features. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.). The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

What is claimed is:

1. A method for identifying object locations, the method comprising:
   receiving image data from a camera, wherein the camera acquires the image data of a roadway;
   identifying objects at the roadway, based on the image data;
   broadcasting traffic signal timing schedule data based on the identification of the objects to vehicles at the roadway;
   identifying a first type of an object and a first location of the first type of the object indicated by the received image data;
   receiving sensor data from one or more sensors;
   identifying a second type of the object and a second location of the second type of the object indicated by the received sensor data; and
   initiating a corrective action based on:
      an identification that the first location and the second location do not match, and
      an inconsistency between the identified first type of the object and the identified second type of the object.

2. The method of claim 1, further comprising dividing the received image data into a series of cells that form a grid pattern, wherein the first location of the first type of the object is identified based on the first type of the object being included in an identified cell within the series of cells of the grid pattern, and wherein the grid pattern corresponds to a first unique location.

3. The method of claim 2, further comprising associating the first location with a position relative to at least one other object detected within the received image data.

4. The method of claim 1, wherein the one or more sensors is the camera that acquires the image data of the roadway and the received sensor data is a second image of the roadway taken by the camera.

5. The method of claim 1, wherein the one or more sensors is a second camera that acquires the image data of the roadway and the received sensor data is a second image of the roadway taken by the second camera.

6. The method of claim 1, wherein the one or more sensors is at a vehicle, wherein the vehicle is at the roadway, and the received sensor data is received from a vehicle computer of the vehicle.

7. The method of claim 1, wherein the corrective action includes recalibrating an image control system.

8. The method of claim 1, wherein the corrective action includes sending a message to a vehicle computer, the message recommending that the one or more sensors be calibrated.

9. The method of claim 1, further comprising:
receiving one or more additional images from the camera;
evaluating the one or more additional images received from the camera for discrepancies; and
identifying that the one or more additional images do not include any data indicative of discrepancies.

10. The method of claim 1, further comprising associating the first location with a global positioning system (GPS) location.

11. The method of claim 1, further comprising associating the first location with a position that is relative to a second cell in a grid pattern.

12. A non-transitory computer-readable storage medium having embodied thereon a program executable by a processor to perform a method for identifying object locations, the method comprising:
receiving image data from a camera, wherein the camera acquires the image data of a roadway;
identifying objects at the roadway, based on the image data;
broadcasting traffic signal timing schedule data based on the identification of the objects to vehicles at the roadway;
identifying a first type of an object and a first location of the first type of the object indicated by the received image data;
receiving sensor data from a one or more sensors;
identifying a second type of the object and a second location of the second type of the object indicated by the received sensor data; and
initiating a corrective action based on:
an identification that the first location and the second location do not match, and
an inconsistency between the identified first type of the object and the identified second type of the object.

13. The non-transitory computer-readable storage medium of claim 12, further comprising instructions executable to divide the received image data into a series of cells that form a grid pattern, wherein the first location of the first type of the object is identified based on the first type of the object being included in an identified cell within the series of cells of the grid pattern, and wherein the grid pattern corresponds to a first unique location.

14. The non-transitory computer-readable storage medium of claim 12, wherein the one or more sensors is the camera that acquires the image data of the roadway, and the received sensor data is a second image of the roadway taken by the camera.

15. The non-transitory computer-readable storage medium of claim 12, wherein the one or more sensors is a second camera that acquires the image data of the roadway, and the received sensor data is a second image of the roadway taken by the second camera.

16. The non-transitory computer-readable storage medium of claim 12, wherein the one or more sensors is at a vehicle, wherein the vehicle is at the roadway, and the received sensor data is received from a vehicle computer of the vehicle.

17. The non-transitory computer-readable storage medium of claim 12, wherein the corrective action includes recalibrating an image control system.

18. The non-transitory computer-readable storage medium of claim 12, wherein the corrective action includes sending a message to a vehicle computer, the message recommending that the one or more sensors be calibrated.

19. The non-transitory computer-readable storage medium of claim 12, further comprising instructions executable to:
receive one or more additional images from the camera;
evaluate the one or more additional images received from the camera for discrepancies; and
identify that the one or more additional images do not include any data indicative of discrepancies.

20. An apparatus for identifying object locations, the apparatus comprising:
a camera that acquires image data of a roadway;
a memory; and
a processor that executes instructions out of the memory to:
identify objects at the roadway, based on the image data;
broadcast traffic signal timing schedule data based on the identification of the objects to vehicles at the roadway;
identify a first type of an object and a first location of the first type of the object from the acquired image data;
identify a second type of the object and a second location of the second type of the object from received sensor data;
initiate a corrective action based on:
an identification that the first location and the second location do not match, and
an inconsistency between the identified first type of the object and the identified second type of the object.

* * * * *